US011948295B2

(12) United States Patent
Shaked et al.

(10) Patent No.: US 11,948,295 B2
(45) Date of Patent: Apr. 2, 2024

(54) VIRTUAL STAINING SYSTEMS AND METHODS FOR OBSERVING ONE OR MORE UNSTAINED CELLS

(71) Applicant: Ramot at Tel-Aviv University Ltd., Tel Aviv (IL)

(72) Inventors: Natan Tzvi Shaked, Mazkeret Batya (IL); Alon Shalev, Tel Aviv (IL); Yoav Nahum Nygate, Tel Aviv (IL)

(73) Assignee: RAMOT AT TEL-AVIV UNIVERSITY LTD., Tel Aviv (IL)

( * ) Notice: Subject to any disclaimer, the term of this patent is extended or adjusted under 35 U.S.C. 154(b) by 664 days.

(21) Appl. No.: 17/256,373

(22) PCT Filed: Jun. 27, 2019

(86) PCT No.: PCT/IB2019/055451
§ 371 (c)(1),
(2) Date: Dec. 28, 2020

(87) PCT Pub. No.: WO2020/003194
PCT Pub. Date: Jan. 2, 2020

(65) Prior Publication Data
US 2021/0158521 A1    May 27, 2021

Related U.S. Application Data

(60) Provisional application No. 62/691,778, filed on Jun. 29, 2018.

(51) Int. Cl.
| G06T 7/00 | (2017.01) |
| G06T 7/13 | (2017.01) |
| G06V 20/69 | (2022.01) |

(52) U.S. Cl.
CPC .............. G06T 7/0012 (2013.01); G06T 7/13 (2017.01); G06V 20/698 (2022.01);
(Continued)

(58) Field of Classification Search
CPC ......... G06T 7/0012; G06T 2207/20084; G06T 2207/30024; G06T 2207/10056;
(Continued)

(56) References Cited

U.S. PATENT DOCUMENTS

2009/0202131 A1  8/2009 Armogida
2010/0128988 A1  5/2010 Kincaid
(Continued)

FOREIGN PATENT DOCUMENTS

WO    13140396 A1    9/2013

OTHER PUBLICATIONS

Rivenson, et al., Deep learning-based virtual histology staining using auto-fluorescence of label-free tissue, arxiv.org, Cornell University Library, 201 Olin Library Cornell University Ithaca, NY 14853, Mar. 30, 2018.
(Continued)

*Primary Examiner* — Ajibola A Akinyemi
(74) *Attorney, Agent, or Firm* — BROWDY AND NEIMARK, P.L.L.C.

(57) ABSTRACT

Systems and methods for visualizing an unstained sperm cell are presented, the system comprises a data input utility that receives measured data comprising at least one quantitative phase microscopy image of the unstained sperm cell; a data processing utility comprising an image analyzer module that utilizes characteristic refractive index information of one or more organelles of the sperm cell, to process the at least one quantitative phase microscopy image and generate at least one corresponding gradient image that includes edge enhancement of the one or more organelles, and a virtual staining module that applies one or more predetermined virtual staining functions to the at least one quantitative phase microscopy image and at least one corresponding gradient image, thereby virtually stain at least one of the one
(Continued)

or more organelles of the sperm cell and generate virtually stained image data of the sperm cell; and an output utility that utilizes the virtually stained image data of the sperm cell and generates one or more stained images of the unstained sperm cell, each stained image emulating an image of the sperm cell should the sperm cell has been actually stained with one or more actual stains.

19 Claims, 6 Drawing Sheets

(52) U.S. Cl.
CPC ............... *G06T 2207/10056* (2013.01); *G06T 2207/20192* (2013.01); *G06T 2207/30024* (2013.01)

(58) Field of Classification Search
CPC . G06T 2207/10064; G06T 2207/20081; G06T 2207/30096; G06T 11/001; G06T 2207/30061; G06T 2207/10024; G06T 2207/20021; G06T 7/13; G06T 7/155; G06T 7/30; G06T 2210/41; G06T 3/4007; G06T 5/001; G06T 5/008
USPC .......................................................... 382/128
See application file for complete search history.

(56) References Cited

U.S. PATENT DOCUMENTS

| | | |
|---|---|---|
| 2014/0221813 A1 | 8/2014 | Bryant-Greenwood et al. |
| 2015/0221102 A1 | 8/2015 | Young et al. |
| 2016/0231225 A1 | 8/2016 | Hayden et al. |
| 2017/0205390 A1* | 7/2017 | Shaked .............. G01N 15/1468 |
| 2020/0123618 A1* | 4/2020 | Batenchuk ........... G06V 10/454 |
| 2020/0222907 A1* | 7/2020 | Klevan .................. C12M 47/04 |
| 2021/0145283 A1* | 5/2021 | Bryant-Greenwood ..................... G06T 5/007 |

OTHER PUBLICATIONS

Bayramoglu et al., Towards Virtual H&E Staining of Hyperspectral Lung Histology Images Using Conditional Generative Adversarial Networks Proceedings of the IEEE International Conference on Computer Vision (ICCV) 2017. IEEE Xplore.

Goodfellow et al., Generative adversarial nets, Advances in neural information processing systems Jun. 10, 2014.

J.W. Goodman, Introduction to Fourier Optics, Second Edition, Published 1968, McGraw-Hill, Chapter 3.5, pp. 46-50.

* cited by examiner

VIRTUAL STAINING SYSTEMS AND METHODS FOR OBSERVING ONE OR MORE UNSTAINED CELLS

TECHNOLOGICAL FIELD

The present invention is generally in the field of biological cell inspection, and relates specifically to observing unstained biological cells, in particular sperm cells.

BACKGROUND

Many clinical assays are based on optical imaging of cell and tissue samples ex-vivo. Biological cells are three-dimensional microscopic dynamic entities, continuously adjusting their sizes, shapes and other biophysical features. Isolated biological cells are mostly-transparent objects, and thus conventional intensity-based light microscopy fails in providing enough contrast between the cell and its environment and between the different compartments in the cell. Exogenous contrast agents such as fluorescent dyes are widely used to solve this problem. However, contrast agents are partially cytotoxic and there is a possibility they will influence the cellular behavior. In addition, fluorescence dyes particularly tend to photobleach, potentially limiting the imaging time. Other types of stains require killing the sample prior to staining.

The concept of virtual staining have been previously described, based on cumbersome, highly sensitive and time consuming methods. For example, in previous works, methods to virtually stain unstained specimens, based on hyperspectral imaging, were developed. In one example described in the article "Towards Virtual H&E Staining of Hyperspectral Lung Histology Images Using Conditional Generative Adversarial Networks" by Bayramoglu et al. (https://ieeexplore.ieee.org/document/8265226), dimension reduction and conditional adversarial generative networks (cGANs) are used which build highly non-linear mappings between input and output images. Conditional GANs' ability to handle very complex functions and high dimensional data enables transforming unstained hyperspectral tissue images to their Hematoxylin and Eosin (H&E) stain's equivalent which provides highly diversified appearance. The authors of the aforementioned article suggested that in the long term, such virtual digital H&E staining could automate some of the tasks in the diagnostic pathology workflow which could be used to speed up the sample processing time, reduce costs, prevent adverse effects of chemical stains on tissue specimens, reduce observer variability, and increase objectivity in disease diagnosis.

GENERAL DESCRIPTION

The present invention provides a novel approach for presenting attributes and characteristics of biological cells/samples by generating stain-like images of the biological cells/samples without using actual stains. This is specifically essential for such biological cells/samples as label-free, live, non-fixated and motile cells, e.g. the human sperm cells, which are unique in their biological classification by belonging to the group of gametes (i.e. a haploid/reproductive cell containing only one set of chromosomes).

A specific example, relating to sperm cells, where staining is not allowed, is assisted reproductive techniques (ART) in human. Approximately 70 million people worldwide need ART to bare children. Following the introduction of in-vitro fertilization (IVF), several efforts have been directed towards identifying the oocyte's and fetus's morphologies as a prognostic tool for IVF success. Works were also conducted on the ability of sperm cell morphology to predict the success rates of natural fertilization, intra-uterine insemination, IVF and intra-cytoplasmatic sperm injection (ICSI), in which a single sperm cell is selected, based on its mobility and overall morphology, using high magnification phase contrast microscope and the selected sperm cell is injected directly into the oocyte retrieved from the female partner. It has been found that sperm morphology is a good predictor for fertilization success and patients with abnormal semen analysis had lower probability of successful pregnancies using IVF. ICSI is the only treatment solution, known to date, for severe male factor infertility. In spite of this, the success rate of ICSI (measured by clinical pregnancy or live birth rate) is still very low, only about 20% of patients undergoing IVF with ICSI succeed in achieving pregnancy. Moreover, several clinical studies have shown that the percentage of chromosomal abnormalities in fetuses and babies conceived using ICSI is higher than in the general population, and even compared to other ART procedures. Ideally, the sperm that is chosen for ICSI should have the highest chance of successful fertilization and subsequent embryo growth. The viability of the sperm cell to be used in ICSI procedure is maintained by diagnostic modalities which are label-free and which do not involve any kind of stain.

One of the known and common techniques for evaluating sperm cell morphological parameters is the qualitative, non-quantitative, label-free bright field microscopy (BFM). Typically, sperm cells are imaged optically using BFM and chosen according to the world health organization (WHO) guidelines. Therefore, a morphological examination of about 200 fixated, stained cells is conducted for the evaluation of properties such as the size of the nucleus and the acrosome. The images are then analyzed visually by an experienced embryologist or using a software (computer assisted sperm analysis (CASA)) that automatically measures the different morphological features. Without staining, sperm cells are nearly transparent under BFM, since their optical properties are only slightly different from their surroundings, resulting in a weak image contrast. Recently, new methods were developed for identifying finer properties of the sperm cell, not seen by BFM, for example surface charge selection. Most of these methods involve biochemical preparations that might change the viability of the cells and thus preclude their use in IVF.

Phase imaging methods use the optical interference phenomenon to record the light delays when passing through the sample and are able to create label-free contrast in the image. Conventional phase-contrast imaging methods have been developed, such as Zernike's phase contrast and Nomarski's differential interference contrast (DIC). DIC is the basis for the motile sperm organelle morphology examination (MSOME) technique. DIC enhances the image edges by shadowing, and thus enables to see details not seen on normal label-free BFM image. However, both Zernike's phase contrast and DIC techniques are not fully quantitative since they do not create meaningful contrast on all points of the measured sperm. In addition, these techniques present significant imaging artifacts, especially near the cell edges, which might yield wrong morphological assays.

Current techniques for examining a sperm cell to identify whether it is suitable for the above procedures, such as ICSI, include visualizing the sperm cells with a ×10-×40 phase microscope. In this magnification, the sperm morphology cannot be visualized well, and accordingly the sperm selection, which is done by catching a single sperm cell using a very small-tip pipette connected into mechanical controller (e.g. micro-manipulator), is challenging.

The microscopic image of a biological specimen in the absence of staining appears colorless, texture-less, and of very low contrast. Therefore, microscopic inspection of tissue requires some sort of chemical staining to generate such desired visual contrast. However, such staining creates obstacles for automated image analysis systems. Due to different chemical formulations, different scanners, section thickness, and lab protocols, similar tissues can greatly differ in their appearance. This huge variability is a challenge in designing robust and resilient automated image analysis systems. Moreover, staining process is time consuming and its chemical effects deform structures of specimens. These limitations are also valid when imaging other types of single cells in a dish. As mentioned above, an unsurpassable challenge is that sperm staining in ART is forbidden when the human sperm cell is intended to be used for fertilizing an oocyte. This is why current methods to characterize sperm cell morphology, prior to its selection and use in any sort of human ART, are limited and have poor success rates.

A technique for determining morphological parameters of label-free sperm cells during a procedure of IVF has been developed by inventors of the present invention and is described in US2017/0205390. According to this technique, measured interferometric phase data of label-free (i.e. stain-free) sperm cell is processed by determining topographic optical phase delay map of the label-free sperm, and determining at least one physical parameter of the label-free sperm, to obtain data indicative of sperm quality for the label-free sperm.

It is an objective of the present invention to provide a method and an apparatus that would enable a lab observer and/or operator that is trained in the practice of analyzing the appearance of stained sperm cells, to be able to observe unstained sperm cells via images that are reliably characteristic of the same sperm cells, assuming a particular desired staining technique would have been applied thereto. The inventors suggest that the availability of such method and apparatus could facilitate taking much more informed decision, while selecting live, unstained, sperm cells for ART procedures, and in particular for ICSI (intra cytoplasmic sperm injection).

It is yet another object of the present invention to provide a method and an apparatus that are adapted to acquire quantitative phase microscopy data of an unstained sperm cell, and generate a visual image of the sperm cell that would have been typically generated by BFM used on the very same sperm cell, following a selected staining thereof.

Accordingly, in one aspect, the present invention teaches a virtual staining apparatus for observing one or more unstained biological sperm cells, capable of generating a simulated visual representation of one or more actual staining of the sperm cell. The apparatus comprises: (a) a quantitative phase microscope (QPM), adapted to generate a quantitative phase image (QPI) of said cell, wherein said QPI comprises a plurality of pixels, each pixel being characterized at least by an intensity and a phase delay; (b) a communication interface configured to provide communication between said QPM and a computer system; (c) a virtual staining module of the computer system configured to generate one or more virtual stained images (VSI), based on said QPI of said unstained cell; (d) an output image generation module of the computer system configured to present said VSI to an operator and/or save it to a digital storage device, wherein said VSI is substantially identical to a microscopic image of said cell, should said cell have been treated with said actual stain.

Sperm cells have a noticeable variance in the values of the refractive indices of the different compartments of the sperm cell, such as the nucleus, the acrosome and the tail. This feature is exploited by the technique of the invention to enhance the contrast among the different compartments in the VSI obtained from the QPI of the sperm cell, for example by enhancing the edges of the different compartments such that they can be recognizable and differentiated.

Thus, according to a broad aspect of the present invention, there is provided a system for visualizing an unstained sperm cell, the system comprising:
a data input utility configured and operable for receiving measured data comprising at least one quantitative phase microscopy image of the unstained sperm cell;
a data processing utility comprising:
an image analyzer module configured and operable to utilize characteristic refractive index information of one or more organelles of the sperm cell, to process said at least one quantitative phase microscopy image and generate at least one corresponding gradient image that includes edge enhancement of said one or more organelles; and
a virtual staining module configured and operable to apply one or more predetermined virtual staining functions to said at least one quantitative phase microscopy image and at least one corresponding gradient image, thereby virtually stain at least one of said one or more organelles of the sperm cell and generate virtually stained image data of the sperm cell; and
an output utility configured and operable to utilize said virtually stained image data of the sperm cell and generate one or more stained images of the unstained sperm cell, each emulating an image of the sperm cell should the sperm cell has been actually stained with one or more actual stains.

In some embodiments, the image analyzer module processes said at least one quantitative phase microscopy image and generates the at least one corresponding gradient image being a differential interference contrast image. The image analyzer module may process said at least one quantitative phase microscopy image and generate two corresponding gradient images being differential interference contrast images, each including a gradient in one of perpendicular directions in the quantitative phase microscopy image.

In some embodiments, the data input utility receives the measured data comprising the at least one quantitative phase microscopy image data and at least one microscopy image of one of the following: a differential interference contrast microscopy image, a Hoffman's microscopy image, and/or dark-field microscopy image of the unstained sperm cell, and utilizes the at least one microscopy image to generate said gradient image.

In some embodiments, the data processing utility comprises a virtual staining function generator module being configured and operable to create at least one of said one or more virtual staining functions by performing the following: receiving first measured data of a plurality of quantitative phase images of a respective plurality of unstained sperm cells, receiving second measured data of a respective plurality of bright field microscopy images of the plurality of the sperm cells after being stained with a specific stain, and processing the first and second measured data utilizing machine deep learning to generate the at least one virtual staining function pertaining to the specific stain.

In some embodiments, the data processing utility comprises a virtual staining function generator module being configured and operable to create at least one of said one or more virtual staining functions by performing the following: receiving first measured data of a plurality of quantitative phase images of a respective first plurality of unstained sperm cells, receiving second measured data of a plurality of bright field microscopy images of a respective second plurality of sperm cells stained with a specific stain, and processing the first and second measured data utilizing machine deep learning to generate the at least one virtual staining function pertaining to the specific stain.

In some embodiments, the machine deep learning comprises one or more of the following: generative adversarial networks, conditional generative adversarial networks, and support vector machine.

In some embodiments, the quantitative phase image data of the unstained sperm cell comprise digital holographic microscopic image data of the unstained sperm cell.

In some embodiments, the unstained sperm cell is a spermatid or spermatozoa cell.

In some embodiments, the one or more organelles of the sperm cell comprise one or more of the following: nucleus, acrosome, mitochondria, vacuole and cytoplasm.

In some embodiments, the one or more actual stains are selected from the group consisting of: nigrosin-eosin, toluidine blue, hematoxylin-eosin, hematoxylin and eosin (H&E), EA50, OG6, Papanicolaou stain, and Coomassie G250.

In some embodiments, the output utility is configured and operable to concurrently or intermittently display a plurality of stained images of the unstained sperm cell, each stained image being characterized by one stain or one organelle in the unstained sperm cell.

In some embodiments, the data processing utility comprises a sperm morphology determining module being configured and operable to process said one or more stained images of the unstained sperm cell and determine one or more morphological parameters of the sperm cell.

In some embodiments, the system further comprises a quantitative phase microscope configured and operable to image the unstained sperm cell and provide said quantitative phase image data of the unstained sperm cell. The quantitative phase microscope may be a digital holographic microscope.

In some embodiments, the system further comprises a sperm sorting facility configured and operable to enable selection of at least one sperm cell from a plurality of sperm cells being visualized by the system, the sperm sorting facility comprises a cartridge for hosting the plurality of sperm cells and enabling individual separation and/or selection of the at least one sperm cell. The cartridge may comprise one or more cell traps enabling said individual separation and/or selection of the at least one sperm cell. The cartridge may comprise a mechanism for removal of sperm cells that are not selected.

According to another broad aspect of the invention, there is provided a method for visualizing an unstained sperm cell, the method comprising:

receiving data comprising: measured data comprising at least one quantitative phase microscopy image of the unstained sperm cell; data indicative of characteristic refractive index information of one or more organelles of the sperm cell; and data indicative of one or more virtual staining functions pertaining to respective one or more actual stains typically used to stain the one or more organelles of the sperm cell;

processing said quantitative phase microscopy image of the sperm cell, by utilizing said characteristic refractive index information, and generating at least one corresponding gradient image that includes edge enhancement of said one or more organelles;

processing said at least one quantitative phase microscopy image and at least one corresponding gradient image, by utilizing said one or more virtual staining functions, thereby virtually stain at least one of said one or more organelles of the sperm cell and generate virtually stained image data of the sperm cell; and generating one or more stained images of the unstained sperm cell from the virtually stained image data of the sperm cell, each stained image emulating an image of the sperm cell should the sperm cell has been actually stained with one or more of the one or more stains.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
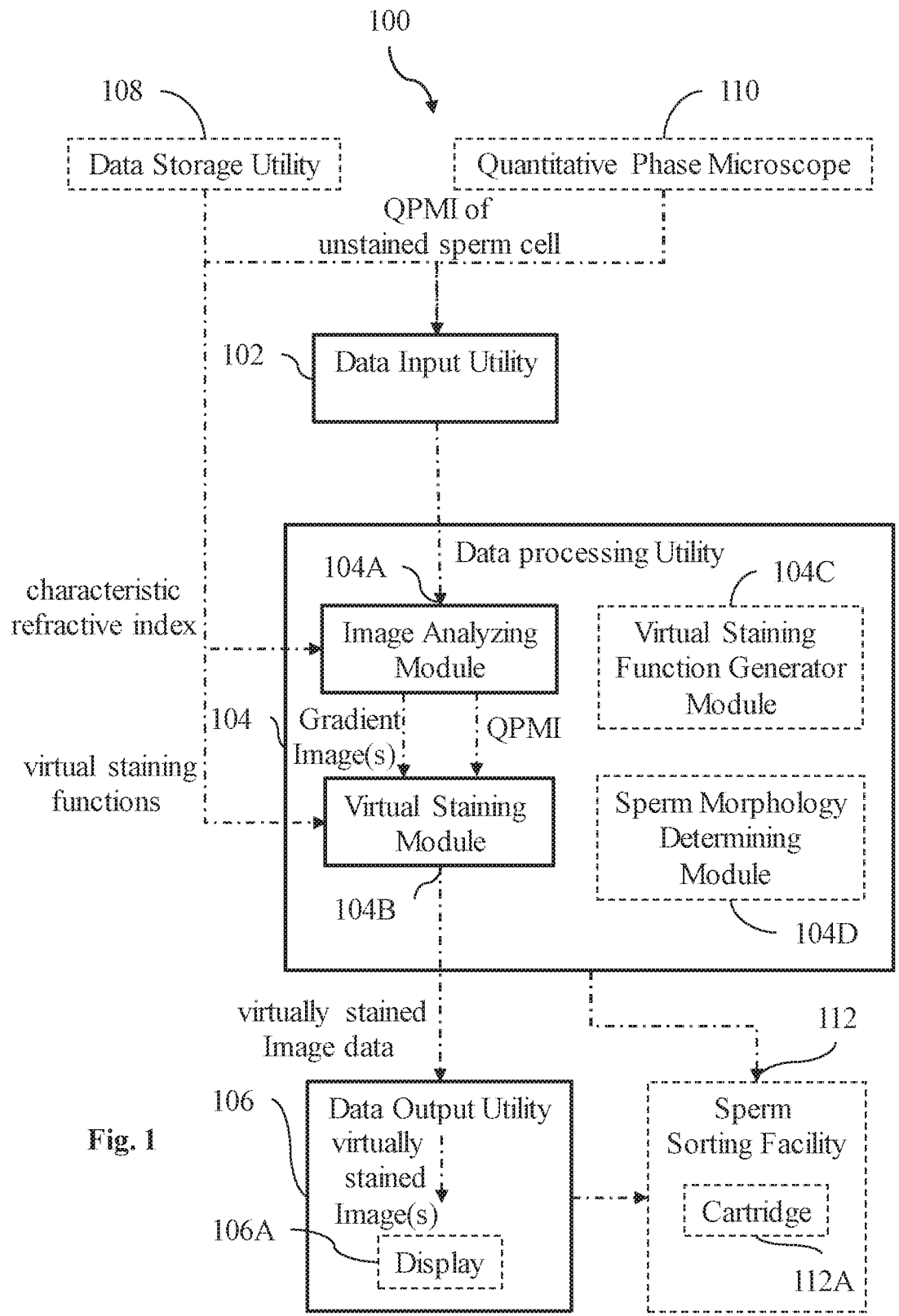
FIG. 1 illustrates, by way of a block diagram, a non-limiting example of a system for visualizing unstained sperm cells, in accordance with an embodiment of the present invention.

Reference is made to FIG. 1 illustrating, by way of a block diagram, a non-limiting example of a system 100 for visualizing an unstained sperm cell, in accordance with an embodiment of the present invention. As shown in the figure, the system includes at least a data input utility 102, a data processing utility 104 and a data output utility 106, collectively configured to receive a quantitative phase microscopy image (QPMI) of an unstained, live and motile sperm cell, process the QPMI and generate one or more virtually stained images (VSI), of the unstained sperm cell, emulating one or more images of the unstained sperm cell should the unstained sperm cell has been actually stained with one or more actual stains. Consequently, the present invention provides virtual staining attributes for a specific unstained sperm cell, as desired/required during examination of the sperm cell. As mentioned above, this is quite helpful as a diagnostic tool during assisted reproduction techniques such as IVF or ICSI mentioned above, in that it enables evaluating the morphology of the visualized unstained sperm cell and making a decision about individually selecting or dismissing the unstained sperm cell for use in the assisted reproduction procedure. The assessment of the morphology of the visualized unstained sperm cell, based on the virtually stained image(s) comparable to the conventional actual staining methods, can be then performed either by a human expert or by a machine built and trained for this purpose.

The system 100 is configured to interact with, or include, one or more other utilities/facilities, and as such the system is configured with one or more communication utilities (not shown, separated from or integral with the data input, data processing and data output utilities), utilizing known in the art communication techniques such as wired or wireless communication protocols. Accordingly, the system 100 can be configured, in its most essential form, as a computerized system as recognized in the art and which, in addition to above described utilities, also includes a memory utility (e.g. a non-transitory memory or computer readable medium) including one or more sequences of instructions for receiving and processing the QMPI and generating the corresponding VSI.

As shown in the figure, the system 100 may include one or more other optional utilities or facilities, denoted by dashed outlines, as will be further described below.

The data input utility 102 is configured and operable to receive measured data including at least one quantitative phase microscopy image (QPMI) of the unstained sperm cell. In some exemplary embodiments, the data input utility 102 can be configured to communicate with a data storage utility 108 saving the QPMI therein, where the data storage utility can be part of the system 100 or can be an external utility configured for communication with the system 100. In one example, the data storage utility can be a cloud-based storage service configured to be accessible by the system 100 for receiving the measured data and the QPMI therefrom. In some other exemplary embodiments, the data input utility 102 is configured and operable to receive the measured data including the QPMI directly from a quantitative phase microscope (QPM) 110. In one example, the system 100 includes as a part thereof the quantitative phase microscope 110. In one other example, the system 100 is configured for communication with an external quantitative phase microscope 110. In some exemplary embodiments, the quantitative phase microscope 110 is configured as an interferometric phase microscope (IPM).

When light passes through different points in the sample, it accumulates a phase delay that is proportional to the integral refractive indices and the geometrical thicknesses along those points. IPM systems enable the reconstruction of the accumulated phase modulation by acquiring a hologram generated from the interference of a sample beam and a reference beam. The ability to reconstruct these phase images is affected by the fact that each pixel in the resulting images contains values that are proportional to the optical path delay (OPD) of the light when it passed through each point in the sample. This paves the way for performing a quantitative analysis on the reconstructed phase images, which can assist with the morphological evaluation of the samples imaged using the IPM system. Frequently, IPM systems for imaging biological cells are implemented using off-axis holography which is achieved by generating an angle between the sample beam and the reference beam. This type of holography allows the acquisition of holograms in a single camera exposure, compared to on-axis holography which usually require several camera exposures. When the captured hologram is Fourier transformed, the spatial frequency domain contains two cross-correlation terms created from the correlation of the sample and reference beams which are separated from the central auto-correlation term. This allows the reconstruction of the complex wavefront of the sample beam. In one preferred example, the quantitative phase microscope 110 can be an inverted microscope configured with a compact IPM module such as the τ-Interferometer described in WO13140396 positioned at the output of inverted microscope.

Another advantage of IPM is that the whole complex wavefront can be reconstructed from the captured holograms, allowing it to be propagated such that unfocused objects will come into focus. Often, when imaging a certain population of sperm cells this will be the case, requiring the clinician to constantly change the focus of the microscope in order to view all of the cells present. By using IPM, a single hologram can be captured with out-of-focus cells. Then, by reconstructing the whole complex wavefront, each sperm cell can be propagated into focus and then virtually stained.

The data input utility 102 is configured to transmit the QPMI of the unstained sperm cell to the data processing utility 104 for processing. The data processing utility 104 includes at least two modules: an image analyzer module 104A configured and operable to utilize characteristic refractive index information of one or more organelles of the sperm cell and process the at least one QPMI and accordingly generate at least one corresponding gradient image that includes edge enhancement of the one or more organelles; and a virtual staining module 104B configured and operable to apply one or more predetermined virtual staining functions to the at least one QPMI and at least one corresponding gradient image, thereby virtually stain at least one of the one or more organelles of the unstained sperm cell and generate virtually stained image data of the unstained sperm cell.

Sperm cells are distinguished cells in that the different organelles and compartments of the cell have distinguishable refractive index values enabling good visualization of the organelles/compartments under phase contrast imaging. Accordingly, the image analyzer module 104A utilizes the characteristic refractive index values of the different organelles/compartments in order to generate one or more gradient images (GI(s)) that further enhance the delimitation and edge detection of the different organelles/compartments as a preliminary step before applying the virtual staining to the QMPI of the unstained sperm cell by the virtual staining module 104B.

In one example, the one or more gradient images are generated by shifting the QPMI by one pixel in one of the spatial directions and then subtracting the shifted image from the original QPMI. Mathematically, given that digital images are represented by a matrix, this can be presented as follows:

$$GI_x = \varphi_s(x,y) - \varphi_s(x+1,y)$$

In some exemplary embodiments, two such gradient images being obtained in two perpendicular directions in the original QPMI are obtained. For example, $GI_x$ above and:

$$GI_y = \varphi_s(x,y) - \varphi_s(x,y+1)$$

In some exemplary embodiments, additionally or alternatively, the one or more gradient images can be obtained from edge-sensitive and/or gradient imaging techniques, such as, but not limited to, differential interference contrast (DIC) microscopy, Hoffman's microscopy or dark field microscopy, either in optical or digital form/means, and provided to the system 100 together with the QPMI(s).

In some exemplary embodiments, utilizing the two gradient images in two directions as described above, a gradient dark field image can be also obtained and used as an input to the virtual staining module 104B. Alternatively, dark field images of the unstained sperm cell can be obtained using a dark field microscope and provided to the system 100 together with QPMI and/or DIC image(s). The dark field images, in which the organelle edges are well discriminated, can either be obtained, as mentioned above, from a darkfield microscope, or be created digitally from the quantitative phase profile as follows:

$$DF = \sqrt{GI_x^2 + GI_y^2}$$

These are non-limiting examples, among other possible manipulations of the quantitative phase images, that help to detect the edges of the organelles in the sperm cell. All the possible manipulations are called herein collectively as gradient images. The virtual staining module 104A receives as an input the QPMI and the gradient image(s) of the unstained sperm cell and applies one or more predetermined virtual staining functions to the at least one quantitative phase microscopy image and at least one corresponding gradient image, thereby virtually stain at least one of the one or more organelles/compartments of the unstained sperm cell and generate virtually stained image data of the unstained sperm cell. The predetermined virtual staining functions can be generated, by a virtual staining function generator module 104C in the data processing utility 104, based on machine learning methods, specifically deep learning methods, as will be described further below, and saved in a memory such as the data storage utility 108, to be accessed and used by the virtual staining module 104B.

The data output utility 106 receives the virtually stained image data of the unstained sperm cell from the data processing utility 104 and generates one or more stained images of the unstained sperm cell, each emulating an image of the sperm cell should the sperm cell has been actually stained with one or more actual stains. The actual stains are stains used in the lab to actually stain the different organelles of the sperm cell. For example, the stains can be one or more of the following: nigrosin-eosin, toluidine blue, hematoxylin-eosin, hematoxylin and eosin (H&E), EA50, OG6, Papanicolaou stain, and Coomassie G250.

In some embodiments, the data output utility 106 generates one or more stained images of the sperm cell based on a predetermined list of organelles of interest. For example, a first stained image with the acrosome alone virtually stained, a second stained image with the mitochondria alone virtually stained, a third stained image with the acrosome and cytoplasm virtually stained, etc. In some other embodiments, the data output utility 106 may be configured to be responsive to an input from a user interested in visualizing a specific organelle or group of organelles in the sperm cell according to his/her preference.

The data output utility 106 can display the generated one or more virtually stained images on an integral display 106A or output the one or more virtually stained images in a format suitable to be presented on a display of an external machine. When configured with the display 106A, the data output utility 106 is configured and operable to concurrently or intermittently display a plurality of stained images of the unstained sperm cell, each stained image being characterized by one or more stains and/or one or more organelles in the unstained sperm cell.

In some exemplary embodiments, the data processing utility 104 further includes a sperm morphology determining module 104D, configured and operable to utilize the virtually stained image data and/or the virtually stained images, generated by the data processing utility and the data output utility respectively, and determine morphological parameters of the visualized sperm cell. The sperm morphology determining module 104D may also be configured and operable to determine whether the morphological parameters of the visualized cell meet the World Health Organization guidelines for the selection of sperm cells in an IVF/ICSI procedure and generate a corresponding recommendation. Alternatively, the user of the system can personally determine what are the morphological parameters, what are the values of the morphological parameters and whether the visualized sperm cell can be selected for use in an IVF/ICSI procedure.

In some exemplary embodiments, the system 100 may also include a sperm sorting facility 112 configured and operable to enable selection of at least one sperm cell from a plurality of sperm cells being visualized by the system. The sperm sorting facility 112 includes a cartridge 112A for hosting the plurality of sperm cells and enabling individual separation and/or selection of the at least one sperm cell. In some embodiments, the cartridge 112A includes a mechanism for removal of sperm cells that are not selected.

According to some embodiments of the invention, the virtual staining functions can be generated using artificial intelligence and/or machine learning, particularly deep learning, methods. Deep learning has emerged as a beneficial tool in the medical imaging field, simplifying many complex image analysis tasks. Deep learning enables a system to learn specific tasks based on observed data. This is done by feeding the data through many processing layers which after a training procedure are able to estimate complex data representations. Non-limiting examples for machine learning methods that can be used to obtain the virtual staining functions of the invention include, but are not limited to, support vector machines or neural networks.

Generative Adversarial Networks (GANs) as proposed by Goodfellow et al., Generative adversarial nets, Advances in neural information processing systems (2014), is a deep learning framework which allows the training of generative models by performing an adversarial process between two deep learning networks, a generator model and a discriminator model. In particular, Deep Convolutional GANs (DC-GANs) has been shown successful for training generative models for image generation tasks. Furthermore, Image-to-Image translation with conditional adversarial networks has been suggested for training generative networks to convert an input image into its corresponding output image. In the present invention, GANs are used to generate the virtual staining function for converting the quantitative phase images of the sperm cells into virtually stained images that are similar to the conventional ones seen by clinicians. As mentioned, GANs consist of two networks: generator (G) and discriminator (D). The generative model G learns a mapping from training data to generate new samples from some prior distribution (random noise vector) by imitating the real data distribution. On the other hand, the discriminator D tries to classify images generated by G whether they came from real training data (true distribution) or fake. These two networks are trained at the same time and updated as if they are playing a game. That is, generator G tries to fool discriminator D and in turn discriminator D adjust its parameters to make better estimates to detect fake images generated by G. Conditional GANs are extensions of GANs where both generator and discriminator are conditioned on additional information. They are used to transform images from one image domain to another image domain when the auxiliary information is an image.

Figure 2:
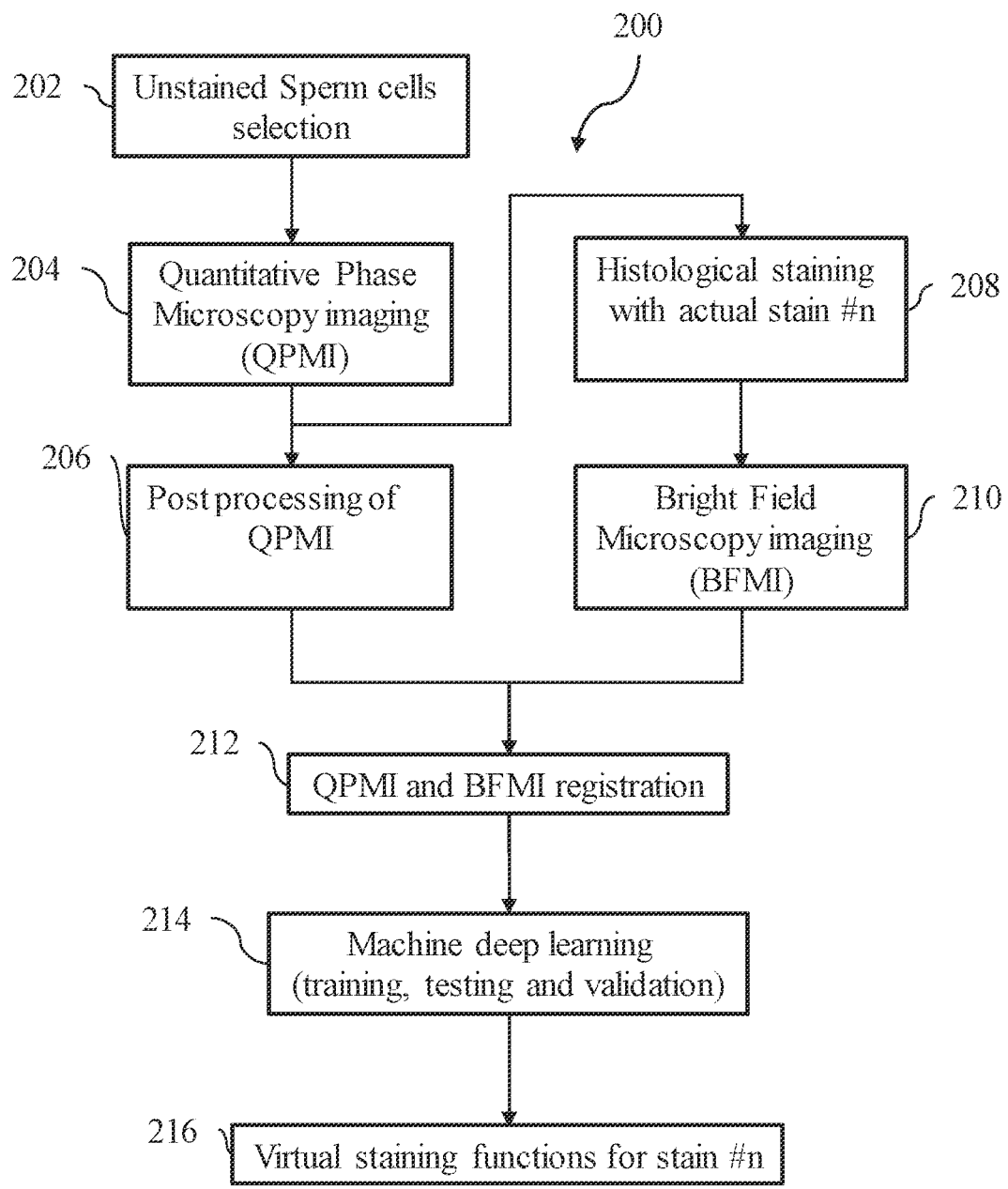
FIG. 2 illustrates, by way of a flow diagram, a non-limiting example of a method for generation of the virtual staining functions, according to some embodiments of the invention.
Figure 3:
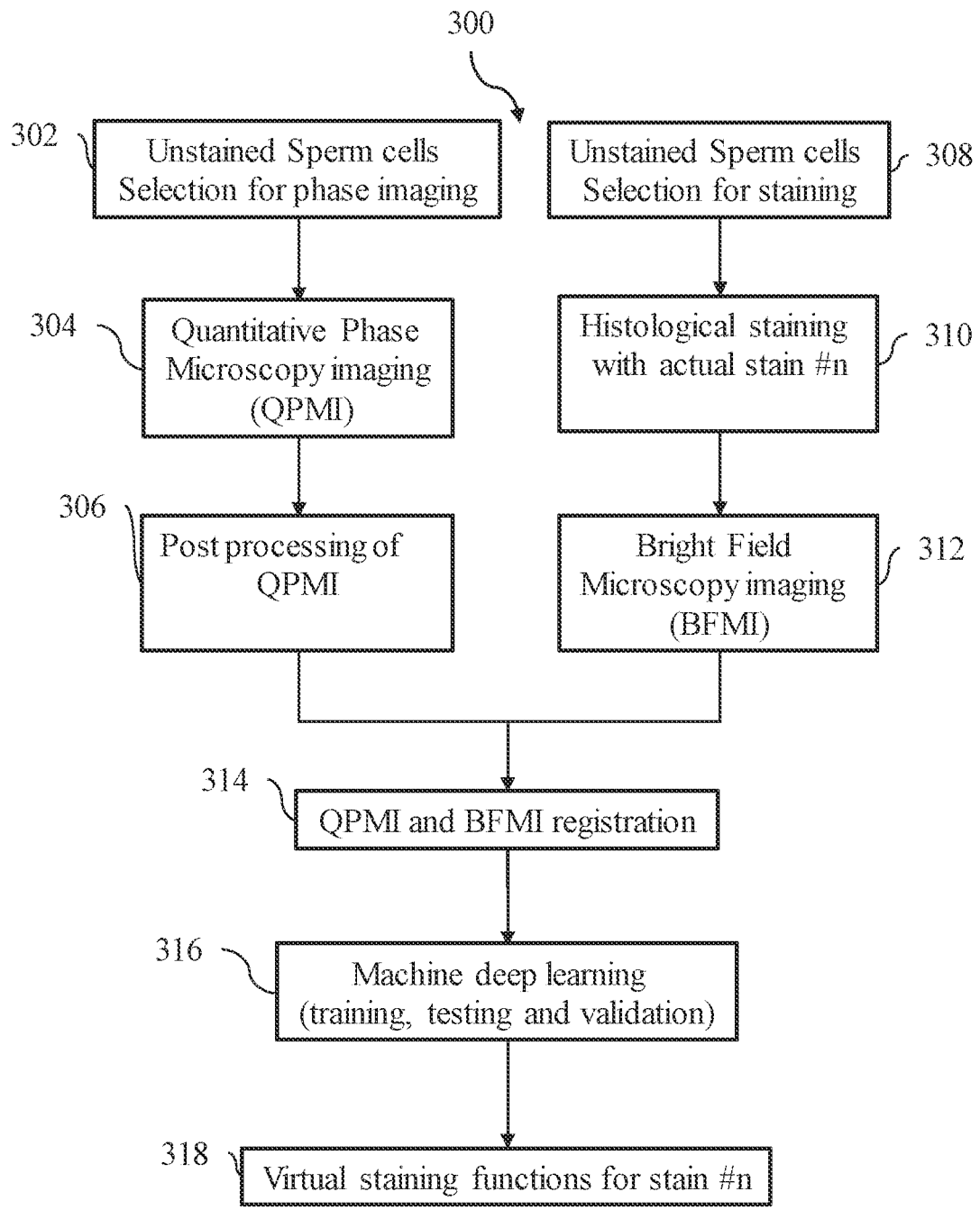
FIG. 3 illustrates, by way of a flow diagram, another non-limiting example of a method for generation of the virtual staining functions, according to some embodiments of the invention.

Reference is now made to FIGS. 2 and 3 illustrating, by way of flow diagrams, non-limiting examples of methods 200 and 300 for generation of the virtual staining functions, according to some embodiments of the invention. The generation of the virtual staining functions can be performed by the virtual staining function generator module 104C.

In FIG. 2, at step 202, a plurality of unstained sperm cells are provided. At step 204, the plurality of the sperm cells are imaged using a quantitative phase microscope (e.g. a holographic microscope), and a respective plurality of quantitative phase microscopy images (QPMI) of the unstained sperm cells are obtained. At step 206, the QPMI are post-processed and one or more gradient images (GI) for each QPMI, as described above, are generated. The plurality of unstained sperm cells are then stained using actual stain(s), at step 208, and imaged using a bright field microscope (BFM), generating a plurality of BFM images (BFMI), at step 210. Accordingly, two sets of images are obtained and registered, at step 212: a first set including QMPI and corresponding GI of the unstained plurality of sperm cells, and a second set including BFMI of the plurality of sperm cells after being stained. Then, at step 214, the first and second sets of images are used as input into machine deep learning, e.g. GANs to generate, at step 216, the virtual staining functions pertaining to the actual stain(s).

In FIG. 3, at step 302, a first plurality of unstained sperm cells are provided. At step 304, the first plurality of the sperm cells are imaged using a quantitative phase microscope (e.g. a holographic microscope), and a respective plurality of quantitative phase microscopy images (QPMI) of the unstained sperm cells are obtained. At step 306, the QPMI are post-processed and one or more gradient images (GI) for each QPMI, as described above, are generated. At step 308, a second plurality of sperm cells are provided. At step 310, the second plurality of sperm cells are stained using actual stain(s), and then imaged, at step 312, using a bright field microscope (BFM), generating a plurality of BFM images (BFMI). Accordingly, two sets of images are obtained and registered, at step 314: a first set including QMPI and corresponding GI of the first plurality of sperm cells, and a second set including BFMI of the second plurality of sperm cells after being stained. Then, at step 316, the first and second sets of images are used as input into GANs to generate, at step 318, the virtual staining functions pertaining to the actual stain(s).

An example of an experiment performed by the inventors to generate the virtual staining functions and test the system, in accordance with the present invention, is herein described, as follows:

Sample Preparation and Imaging of Label Free Sperm Cells

After collecting 1200 semen samples from donors, a drop of 5-10 µL was smeared onto several clean microscopic slides with a 2×2 point grid painted onto them for localization of the sperm cells when transferring the samples between the systems. Those smeared drops where then left to dry for 5 minutes and then fixed to the slides with 98% ethanol for 10 minutes. The slides where then imaged using an IPM system which can be seen in FIG. 4A. The shown system consists of the τ-Interferometer connected at the output of an inverted microscope. A supercontinuum fiber light source (SC-400-4 Fianium) connected to an acousto-optical tunable filter (SC-AOTF, Fianium) was used as the light source for the inverted microscope, emitting wavelengths of 532±3.1 nm. The beam first passes through the sample, then magnified using the microscope objective MO (63×, 1.4 NA, oil immersion, infinity-corrected) and passes through a spherical tube lens TL (150 mm focal length). Then, it passes through lens L1 (100 mm focal length) which Fourier transforms the beam, and beam splitter BS splits the beam into two separate beams. One beam passes straight through the beam splitter and then reflected back and shifted by retro-reflector RR. This beam is then reflected by the beam splitter and inverse Fourier transformed by lens L2 (150 mm focal length) onto a CMOS camera with 1280× 1024 pixels (pixel size of 5.2 µm, DCC1545M, Thorlabs). This beam acts as the sample beam in this interferometric set-up. The second beam is reflected by the beam splitter onto a mirror-pinhole configuration, PH and M3, which spatially filters the beam, thus erasing the sample information, creating the reference beam. This beam is then reflected back and passes through the beam splitter where it is then inverse Fourier transformed by lens L2 and interferes with the sample beam on the camera. The final result is an off-axis interference pattern which is then transferred to the data processing utility 104 for further digital analysis.

Sample Preparation and Imaging of Stained Sperm Cells

After the sperm cells were imaged using the IPM system, they were stained using Quick Stain (Biological Industries) and left to dry for 15 minutes. Then, using the 2×2 point grid, the field of views captured using the IPM system were located once again and imaged using a brightfield microscope (Axio Observer D1, Ziess).

Reconstruction Process of the Holograms

Figure 4:
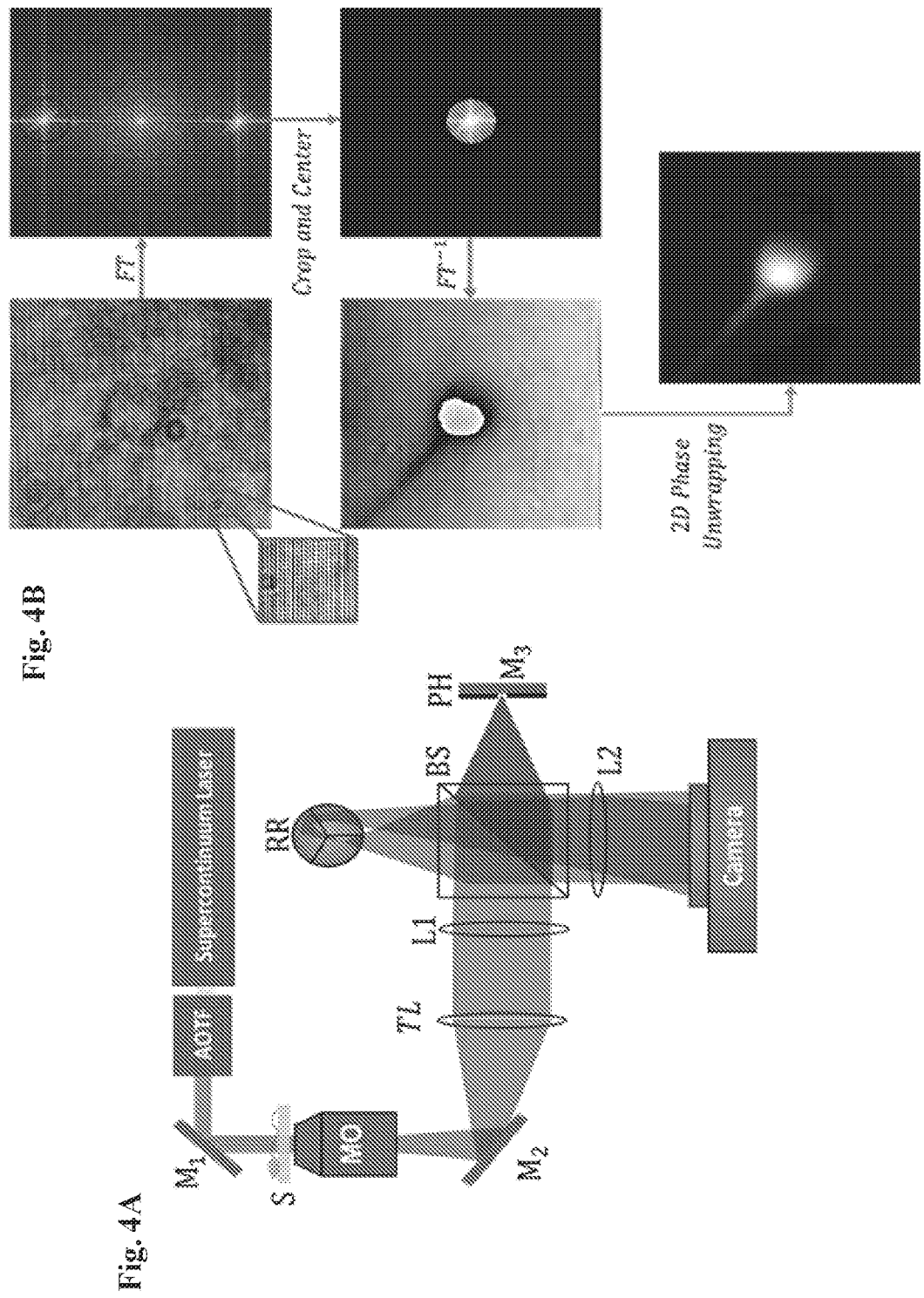
FIGS. 4A-4B illustrate, respectively, an IPM system used for acquiring quantitative phase images of label-free sperm cell, and the reconstruction process of the phase images of the label-free sperm cell.

The off-axis interference pattern captured by the camera can be mathematically formulated as follows:

$$I = |S + R|^2 =$$
$$|r(x, y)|^2 + |s(x, y)|^2 + r^*(x, y)s(x, y)\exp\left(-j\frac{2\pi}{\lambda}(\varphi_s - \varphi_r + y\sin\theta_y)\right) +$$
$$r(x, y)s^*(x, y)\exp\left(j\frac{2\pi}{\lambda}(\varphi_s - \varphi_r + y\sin\theta_y)\right)$$
$$\text{where } S(x, y) = s(x, y)\exp\left(-j\frac{2\pi}{\lambda}\varphi_s\right)\exp\left(-j\frac{2\pi}{\lambda}y\sin\theta_y\right)$$

is the sample beam slightly inclined at an off-axis angle of $\theta_y$ along the y axis, $$R(x, y) = r(x, y)\exp\left(-j\frac{2\pi}{\lambda}\varphi_r\right)$$

is the reference beam, $\varphi_s$ and $\varphi_r$ are the sample and reference beam phases respectively, and $\lambda$ is the wavelength of the light source. In the spatial frequency domain, the last two terms of the equation are the cross-correlation terms which are shifted relative to the DC term located in the center of the spatial frequency domain. Each cross-correlation term contains the complex wavefront of the sample which allows the extraction of the sperm cells' phase information. The reconstruction process of the phase images of the label-free sperm cells is illustrated in FIG. 4B. First, the holograms were cropped into smaller images of 256×256 pixels containing single cells. Then, each sub-hologram was Fourier transformed to the spatial frequency domain where one of the cross-correlation terms was cropped and then inverse Fourier transformed into the complex wavefront of the sample beam. Finally, the phase information was extracted from the complex wavefront which then underwent a 2D phase unwrapping algorithm.

Post Processing of the Phase Images: Calculation of Gradient Images from the Phase Images two gradient images were created from each phase image. Those images were generated by shifting the phase images by one pixel in one of the spatial directions (x or y) and then subtracting the shifted image from the original phase image.

Wavefront Propagation of an Out-of-Focus Hologram

In order to reconstruct a focused phase image of a sample from an out-of-focus hologram, a 256×256 hologram of a human sperm cell was used. After applying a Fourier transform on the hologram and cropping and centering one of the cross-correlation terms as seen in FIG. 4B, the centered complex cross-correlation matrix was then transferred to a propagation algorithm. Rayleigh-Sommerfeld propagation of the angular spectrum as described by J. W. Goodman PROVIDE BIBLIOGRAPHIC DATA, was used. As a part of the propagation algorithm, the complex wavefront was propagated to different z-planes between −5 μm and 5 μm relative to the original focus plane at 0 μm. This was done in increments of 0.1 μm, such that 100 refocused complex wavefronts were generated. Finally, a phase image was generated from each propagated complex wavefront which enabled an optimal focused phase image to be chosen.

Digital Pre-Processing

As with the holograms, the brightfield images of the stained sperm cells were cropped as well into a slightly larger field of view that still included the same single sperm cells that were imaged using the IPM system. In order to locate the exact 256×256 pixels field of view as in the phase images, each brightfield image was cross-correlated with the corresponding phase image of the same cell. This resulted in the location of the center of the required 256×256 field of view in the slightly larger brightfield images. Finally, the brightfield images were cropped into 256×256 images around the centers that were located using the cross-correlation of the two images, thus registering between the field of views of the phase images and the brightfield images. This resulted in two datasets, one containing the brightfield images of the stained sperm cells, and the other containing the phase images and GI images of the same sperm cells, where there is an exact overlap between the field of views of the two datasets.

After constructing the above-mentioned dataset, it was further augmented by performing 90 degrees rotations for each image, and then horizontally flipping all existing and new images in the dataset. Overall, this caused the original dataset to increase by 8-fold.

Training and Testing Procedures

Figure 5:
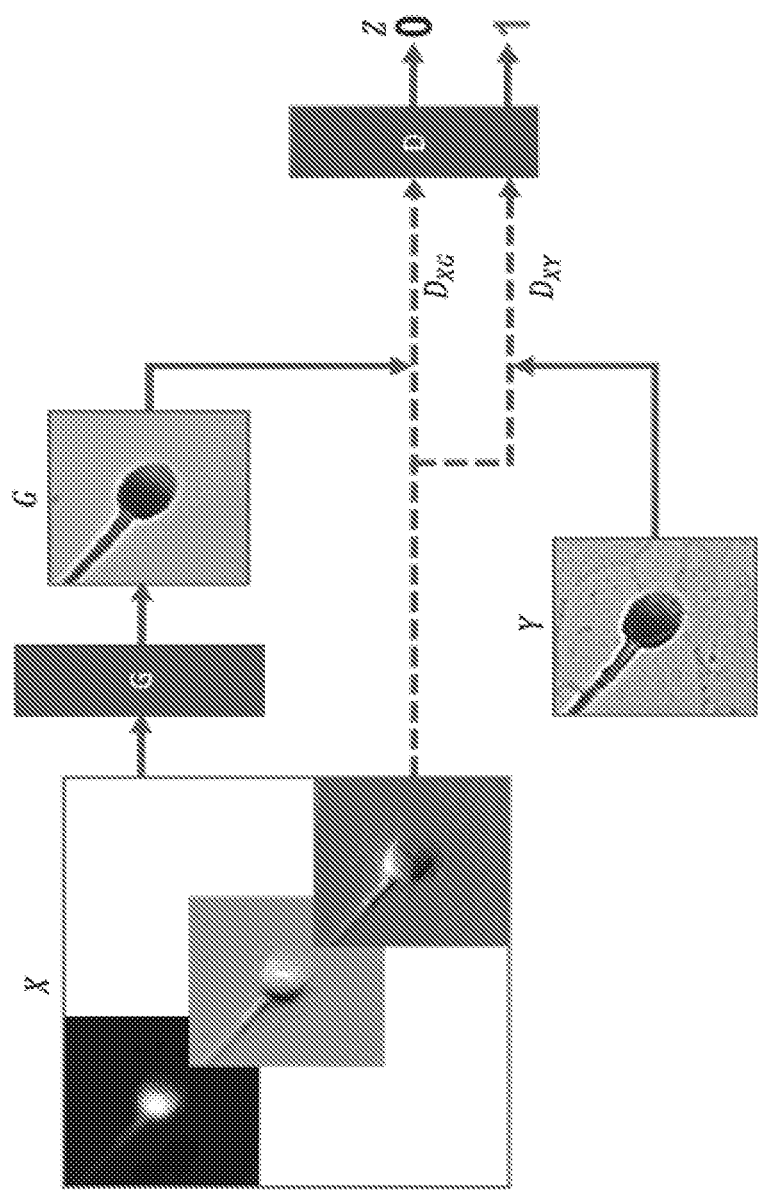
FIG. 5 exemplifies training a neural network, e.g. a generative adversarial network, in accordance with the present invention.

GAN framework was used in order to train a deep learning model to virtually stain sperm cells. This framework consisted of one generator model that was trained to create the virtually stained images from the phase and Gradient images of the cells, and a discriminator model that was trained to discriminate between generated and real stained images. As seen in FIG. 5, in order to train the generator and discriminator networks, the generator receives an input X which is a concatenation between the quantitative phase image and the two gradient images of the sperm cells and eventually generates output Z. It is trained to generate G which is a virtually stained image of the same sperm cell that was fed through the generator network. Since the discriminator is trained to distinguish between generated and real stained images, in one case it receives $D_{XY}$ which indicates that the generator's input X is fed through the discriminator together with the chemically stained image of the sperm cell Y. In another case, the discriminator receives $D_{XG}$ which indicates that the generator's input X is fed through the discriminator together with the generated virtually stained image G.

Figure 6A:
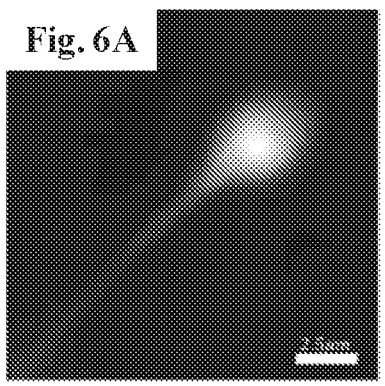
FIGS. 6A-6E show an example of virtually staining a label-free sperm cell utilizing the technique of the present invention.
Figure 6B:
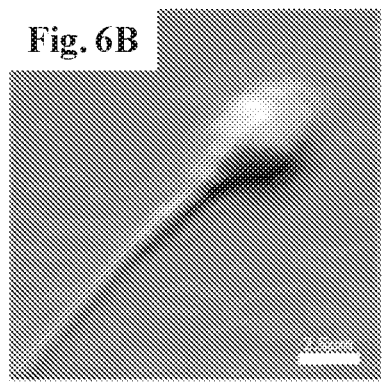
Figure 6C:
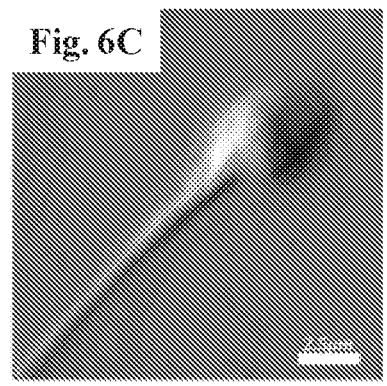
Figure 6D:
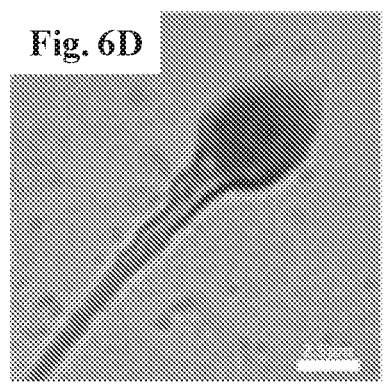
Figure 6E:
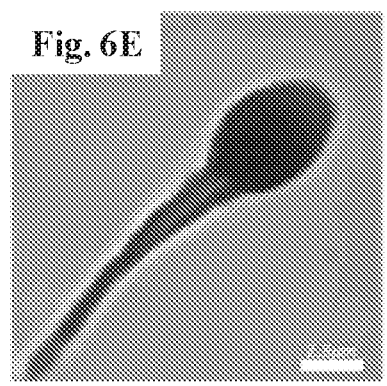

An example of the virtual staining of unstained sperm cell, according to the technique of the invention, is shown in FIGS. 6A-6E. In FIG. 6A, the reconstructed phase image of the label-free sperm cell is shown. In FIG. 6B, a gradient image with a shearing in the y direction is shown. In FIG. 6C, a gradient image with a shearing in the x direction is shown. In FIG. 6D, the actual Quick Stain staining of the sperm cell is shown. In FIG. 6E, the virtual staining of the label-free sperm cell which was created by the system of the invention is shown.

The results of the virtual staining by the system of the invention were tested with an experienced embryologist who has examined the same sperm cells being virtually stained and being actually stained, however unpaired, according to the WHO guidelines, and it was concluded that virtually staining sperm cells achieves similar performance compared to classifying actually stained sperm cells.

The invention claimed is:

1. A system for visualizing an unstained sperm cell, the system comprising:
    a data input utility configured and operable for receiving measured data comprising at least one quantitative phase microscopy image of the unstained sperm cell;
    a data processing utility comprising:
    an image analyzer module configured and operable to utilize characteristic refractive index information of one or more organelles of the sperm cell, to process said at least one quantitative phase microscopy image and generate at least one corresponding gradient image that includes edge enhancement of said one or more organelles; and
    a virtual staining module configured and operable to apply one or more predetermined virtual staining functions to said at least one quantitative phase microscopy image and at least one corresponding gradient image, thereby virtually stain at least one of said one or more organelles of the sperm cell and generate virtually stained image data of the sperm cell; and
    an output utility configured and operable to utilize said virtually stained image data of the sperm cell and generate one or more stained images of the unstained sperm cell, each emulating an image of the sperm cell should the sperm cell has been actually stained with one or more actual stains;
    wherein said data processing utility comprises a virtual staining function generator module being configured and operable to create at least one of said one or more virtual staining functions by performing the following:
    receiving first measured data of a plurality of quantitative phase images of a respective plurality of unstained sperm cells, and second measured data of a respective plurality of bright field microscopy images corresponding to one of the following: the plurality of the sperm cells after being stained with a specific stain; or the plurality of sperm cells stained with a specific stain, and
    processing the first and second measured data utilizing machine deep learning to generate the at least one virtual staining function pertaining to the specific stain.

2. The system according to claim 1, wherein said image analyzer module is adapted to process said at least one quantitative phase microscopy image and generate one or more corresponding gradient images, each gradient image being a differential interference contrast image including a gradient in one of perpendicular directions in the quantitative phase microscopy image.

3. The system according to claim 1, wherein said data input utility receives the measured data comprising the at least one quantitative phase microscopy image data and at least one microscopy image of one of the following: a differential interference contrast microscopy image, a Hoffman's microscopy image, and/or dark-field microscopy image of the unstained sperm cell, and utilizes the at least one microscopy image to generate said gradient image.

4. The system according to claimer 1, wherein said machine deep learning comprises one or more of the following: generative adversarial networks, conditional generative adversarial networks, and support vector machine.

5. The system according to claim 1, wherein said quantitative phase image data of the unstained sperm cell comprise digital holographic microscopic image data of the unstained sperm cell.

6. The system according to claim 1, wherein said output utility is configured and operable to concurrently or intermittently display a plurality of stained images of the unstained sperm cell, each stained image being characterized by one stain or one organelle in the unstained sperm cell.

7. The system according to claim 1, wherein said data processing utility comprises a sperm morphology determining module being configured and operable to process said one or more stained images of the unstained sperm cell and determine one or more morphological parameters of the sperm cell.

8. The system according to claim 1, further comprising at least one of the following: a quantitative phase microscope configured and operable to image the unstained sperm cell and provide said quantitative phase image data of the unstained sperm cell; and a sperm sorting facility configured and operable to enable selection of at least one sperm cell from a plurality of sperm cells being visualized by the system, the sperm sorting facility comprises a cartridge for hosting the plurality of sperm cells and enabling individual separation and/or selection of the at least one sperm cell.

9. The system according to claim 1, further comprising a quantitative phase microscope configured as a digital holographic microscope adapted to image the unstained sperm cell and provide said quantitative phase image data of the unstained sperm cell.

10. The system according to claim 1, further comprising a sperm sorting facility configured and operable to enable selection of at least one sperm cell from a plurality of sperm cells being visualized by the system, the sperm sorting facility comprises a cartridge for hosting the plurality of sperm cells and enabling individual separation and/or selection of the at least one sperm cell, said cartridge comprising one or more cell traps enabling said individual separation and/or selection of the at least one sperm cell.

11. The system according to claim 10, wherein said cartridge comprises a mechanism for removal of sperm cells that are not selected.

12. A method for visualizing an unstained sperm cell, the method comprising:
receiving data comprising: measured data comprising at least one quantitative phase microscopy image of the unstained sperm cell; data indicative of characteristic refractive index information of one or more organelles of the sperm cell; and data indicative of one or more virtual staining functions pertaining to respective one or more actual stains typically used to stain the one or more organelles of the sperm cell;
processing said quantitative phase microscopy image of the sperm cell, by utilizing said characteristic refractive index information, and generating at least one corresponding gradient image that includes edge enhancement of said one or more organelles;
processing said at least one quantitative phase microscopy image and at least one corresponding gradient image, by utilizing said one or more virtual staining functions, thereby virtually stain at least one of said one or more organelles of the sperm cell and generate virtually stained image data of the sperm cell; and
generating one or more stained images of the unstained sperm cell from the virtually stained image data of the sperm cell, each stained image emulating an image of the sperm cell should the sperm cell has been actually stained with one or more of the one or more stains;
wherein at least one of said one or more virtual staining functions is created by performing the following:
receiving first measured data of a plurality of quantitative phase images of a respective plurality of unstained sperm cells, and second measured data of a respective plurality of bright field microscopy images comprising one of the following: the plurality of the sperm cells after being stained with a specific stain, or the plurality of sperm cells stained with a specific stain, and
processing the first and second measured data utilizing machine deep learning to generate the at least one virtual staining function pertaining to the specific stain.

13. The method according to claim 12, wherein each of said at least one corresponding gradient image is a differential interference contrast image including a gradient in one of perpendicular directions in the quantitative phase microscopy image.

14. The method according to claim 12, wherein said receiving of the measured data further comprises receiving at least one microscopy image of one of the following: a differential interference contrast microscopy image, a Hoffman's microscopy image, and/or dark-field microscopy image of the unstained sperm cell, the method further comprises utilizing the at least one microscopy image to generate said gradient image.

15. The system according to claim 12, wherein said quantitative phase microscopy image of the unstained sperm cell comprise digital holographic microscopic image data of the unstained cell.

16. The method according to claim 12, wherein said unstained sperm cell is a spermatid or spermatozoa cell.

17. The method according to claim 16, wherein said one or more organelles of the cell comprise one or more of the following: nucleus, acrosome, mitochondria, vacuole and cytoplasm.

18. The method according to claim 12, wherein said one or more actual stains are selected from the group consisting of: nigrosin-eosin, toluidine blue, hematoxylin-eosin, hematoxylin and eosin (H&E), EA50, OG6, Papanicolaou stain, and Coomassie G250.

19. The method according to claim 12, further comprising at least one of the following: processing said one or more stained images of the unstained sperm cell and determining one or more morphological parameters of the sperm cell;

and selecting at least one unstained sperm cell from a plurality of unstained sperm cells being visualized.

\* \* \* \* \*